United States Patent
Pierce, II et al.

(10) Patent No.: US 9,398,404 B2
(45) Date of Patent: *Jul. 19, 2016

(54) SYSTEM AND METHOD FOR USER INTERACTION WITH VIRTUAL GEOGRAPHIC ZONES

(71) Applicants: Robert L. Pierce, II, Dallas, TX (US); James L. Northrup, Dallas, TX (US)

(72) Inventors: Robert L. Pierce, II, Dallas, TX (US); James L. Northrup, Dallas, TX (US)

(*) Notice: Subject to any disclaimer, the term of this patent is extended or adjusted under 35 U.S.C. 154(b) by 63 days.

This patent is subject to a terminal disclaimer.

(21) Appl. No.: 13/924,395

(22) Filed: Jun. 21, 2013

(65) Prior Publication Data

US 2013/0344897 A1  Dec. 26, 2013

Related U.S. Application Data

(60) Provisional application No. 61/662,980, filed on Jun. 22, 2012.

(51) Int. Cl.
*H04W 24/00* (2009.01)
*H04W 4/02* (2009.01)

(52) U.S. Cl.
CPC .............. *H04W 4/02* (2013.01); *H04W 4/021* (2013.01)

(58) Field of Classification Search
CPC ... H04W 4/02; H04W 64/00; H04L 29/08657
USPC .......... 455/456.3, 456.1, 404.2, 414.1, 422.1
See application file for complete search history.

(56) References Cited

U.S. PATENT DOCUMENTS

| 7,200,566 B1 | 4/2007 | Moore et al. |
| 7,689,229 B2 | 3/2010 | Geary et al. |
| 7,848,765 B2 | 12/2010 | Phillips et al. |
| 7,853,786 B1 | 12/2010 | Fultz et al. |

(Continued)

FOREIGN PATENT DOCUMENTS

| CA | 2422693 | 3/2002 |
| JP | 2000292182 | 10/2000 |

(Continued)

OTHER PUBLICATIONS

Mick Roberts, Science Fiction Becomes Farming Fact, Profi International—The Farm Machinery Magazine, May 2007, pp. 36-38, Agri Publishing International Ltd., Halsham, East Sussex, United Kingdom.

(Continued)

*Primary Examiner* — Nghi H Ly
(74) *Attorney, Agent, or Firm* — Schultz & Associates, P.C.

(57) ABSTRACT

A system and method for user interaction includes a network, a server connected to the network, an administrator device receiving information from a global positioning system and connected to the network, a user device receiving information from the global positioning system and connected to the network. The administrator, having the administrator device, defines a set of virtual geographic zones and sub-zones in which the user device is tracked, and saves the set of virtual geographic zones and sub-zones to an administrator account on the server. The user downloads a user application, sets-up a user account, and downloads the set of virtual geographic zones and sub-zones. As the user, having the user device, moves through the virtual geographic zones and sub-zones the location of the user device is determined and a set of administrator-defined actions are executed on the user device based on the location of the user device.

29 Claims, 13 Drawing Sheets

(56) References Cited

U.S. PATENT DOCUMENTS

| | | |
|---|---|---|
| 7,995,996 B2 | 8/2011 | Link et al. |
| 8,099,109 B2 | 1/2012 | Altman et al. |
| 8,204,654 B2 | 6/2012 | Sachs et al. |
| 8,244,468 B2 | 8/2012 | Scalisi et al. |
| 8,249,559 B1 | 8/2012 | Meiss et al. |
| 8,254,961 B2 | 8/2012 | Moon et al. |
| 8,374,623 B2 * | 2/2013 | Vellanki et al. ............ 455/456.1 |
| 8,451,131 B2 | 5/2013 | Ghazarian |
| 8,496,530 B2 | 7/2013 | Dean |
| 8,509,803 B2 | 8/2013 | Gracieux |
| 8,521,131 B1 | 8/2013 | Ramalingam et al. |
| 8,554,243 B2 | 10/2013 | Klassen et al. |
| 8,560,557 B1 | 10/2013 | Poe |
| 8,644,506 B2 | 2/2014 | Zellner |
| 8,644,856 B2 | 2/2014 | Kim et al. |
| 8,666,436 B2 | 3/2014 | Ellanti et al. |
| 8,671,143 B2 | 3/2014 | Lewis |
| 8,682,356 B2 | 3/2014 | Poe et al. |
| 8,684,828 B1 | 4/2014 | Coronel et al. |
| 8,768,319 B2 | 7/2014 | Ramer et al. |
| 8,774,839 B2 | 7/2014 | Busch |
| 8,799,361 B2 | 8/2014 | Ross et al. |
| 8,825,085 B1 | 9/2014 | Boyle et al. |
| 8,833,650 B1 | 9/2014 | Mcghie et al. |
| 8,838,138 B2 | 9/2014 | Modali et al. |
| 8,862,150 B2 | 10/2014 | Phillips et al. |
| 8,862,378 B2 | 10/2014 | Curatolo et al. |
| 8,880,047 B2 | 11/2014 | Konicek et al. |
| 8,890,685 B1 | 11/2014 | Sookman et al. |
| 2002/0065713 A1 | 5/2002 | Awada et al. |
| 2003/0225621 A1 | 12/2003 | Nurchaya et al. |
| 2004/0192337 A1 | 9/2004 | Hines et al. |
| 2005/0256781 A1 | 11/2005 | Sands et al. |
| 2006/0003828 A1 | 1/2006 | Abecassis |
| 2006/0046712 A1 | 3/2006 | Shamp et al. |
| 2008/0312946 A1 | 12/2008 | Valentine et al. |
| 2009/0055691 A1 | 2/2009 | Ouksel et al. |
| 2009/0163216 A1 * | 6/2009 | Hoang et al. .................. 455/450 |
| 2009/0307067 A1 | 12/2009 | Obermeyer |
| 2010/0287011 A1 | 11/2010 | Muchkaev |
| 2010/0312633 A1 | 12/2010 | Cervenka |
| 2011/0099070 A1 | 4/2011 | Eliason |
| 2011/0238476 A1 | 9/2011 | Carr et al. |
| 2011/0269480 A1 | 11/2011 | Fong et al. |
| 2012/0109752 A1 | 5/2012 | Strutton et al. |
| 2012/0130796 A1 | 5/2012 | Busch |
| 2012/0158508 A1 | 6/2012 | Kilroy et al. |
| 2012/0276928 A1 * | 11/2012 | Shutter ....................... 455/456.3 |
| 2012/0284769 A1 | 11/2012 | Dixon et al. |
| 2012/0323664 A1 | 12/2012 | Klems |
| 2013/0073377 A1 | 3/2013 | Heath |
| 2013/0091452 A1 | 4/2013 | Sorden et al. |
| 2013/0158860 A1 | 6/2013 | Gum |
| 2013/0189946 A1 | 7/2013 | Swanson |
| 2013/0225282 A1 | 8/2013 | Williams et al. |
| 2013/0246175 A1 | 9/2013 | Bilange et al. |
| 2013/0275221 A1 | 10/2013 | Zeto et al. |
| 2013/0281189 A1 | 10/2013 | Gagner et al. |
| 2013/0288778 A1 | 10/2013 | Johnson |
| 2014/0028456 A1 | 1/2014 | Sadhu |
| 2014/0035726 A1 | 2/2014 | Schoner et al. |
| 2014/0094277 A1 | 4/2014 | Guinn et al. |
| 2014/0162692 A1 | 6/2014 | Li et al. |
| 2014/0167961 A1 | 6/2014 | Finlow-bates |
| 2014/0195421 A1 | 7/2014 | Lozito |
| 2014/0201849 A1 | 7/2014 | Earley |
| 2014/0206436 A1 | 7/2014 | French |
| 2014/0207499 A1 | 7/2014 | Fliess et al. |
| 2014/0278860 A1 | 9/2014 | Lee et al. |
| 2014/0279123 A1 | 9/2014 | Harkey et al. |
| 2014/0279503 A1 | 9/2014 | Bertanzetti et al. |
| 2014/0292511 A1 | 10/2014 | Sheha et al. |
| 2014/0295944 A1 | 10/2014 | Faircloth |
| 2014/0308915 A1 | 10/2014 | Reitnour et al. |
| 2014/0337123 A1 | 11/2014 | Nuernberg et al. |
| 2014/0344011 A1 | 11/2014 | Dogin et al. |

FOREIGN PATENT DOCUMENTS

| | | |
|---|---|---|
| JP | 2004080554 | 3/2004 |
| JP | 2006053646 | 2/2006 |
| JP | 2007042006 | 2/2007 |
| JP | 2007188150 | 7/2007 |
| WO | 0114954 | 3/2001 |
| WO | 0215086 | 2/2002 |
| WO | 2006009704 | 1/2006 |
| WO | 2008083105 | 7/2008 |
| WO | 2009035469 | 3/2009 |
| WO | 2010078616 | 7/2010 |
| WO | 2011077449 | 6/2011 |
| WO | 2014113882 A1 | 7/2014 |
| WO | 2014130090 A1 | 8/2014 |
| WO | 2014144760 A1 | 9/2014 |

OTHER PUBLICATIONS

GPS Source, GCommercial—Retail GPS Retransmission, Re-radiator, GPS Repeating, GPS Retran, L1 Antennas, L1/L2 Antennas, GPS Antenas, et al., http://www.gpssource.com/commercial/retail, Jun. 21, 2012, pp. 1-2.
GPSHOPPER, Mobile Applications and Websites for Retailers, http://www.gpshopper.com/, Jun. 21, 2013, pp. 1-2.
Moxtionx, MotionX-GPS Overview, http://gps.motionx.com/iphone/overview/, Jun. 21, 2013, pp. 1-3.
Geocaching, The Official Global GPS Cache Hunt Site, http://www.geocaching.com/, Jun. 21, 2013, p. 1.
InstaMapper, InstaMapper Free Real-Time GPS Tracking, http://www.instamapper.com/, Jun. 21, 2013, p. 1.
GPS Visualizer, GPS Visualizer: Do-It-Yourself Mapping, http://www.gpsvisualizer.com/, Jun. 21, 2013, pp. 1-2.
Expert GPS, Calculating Area with a GPS: Calculate Acreage with a Garmin GPS, http://www.expertgps.com/calculating-area-with-a-gps.asp, Jun. 21, 2013, pp. 1-3.

* cited by examiner

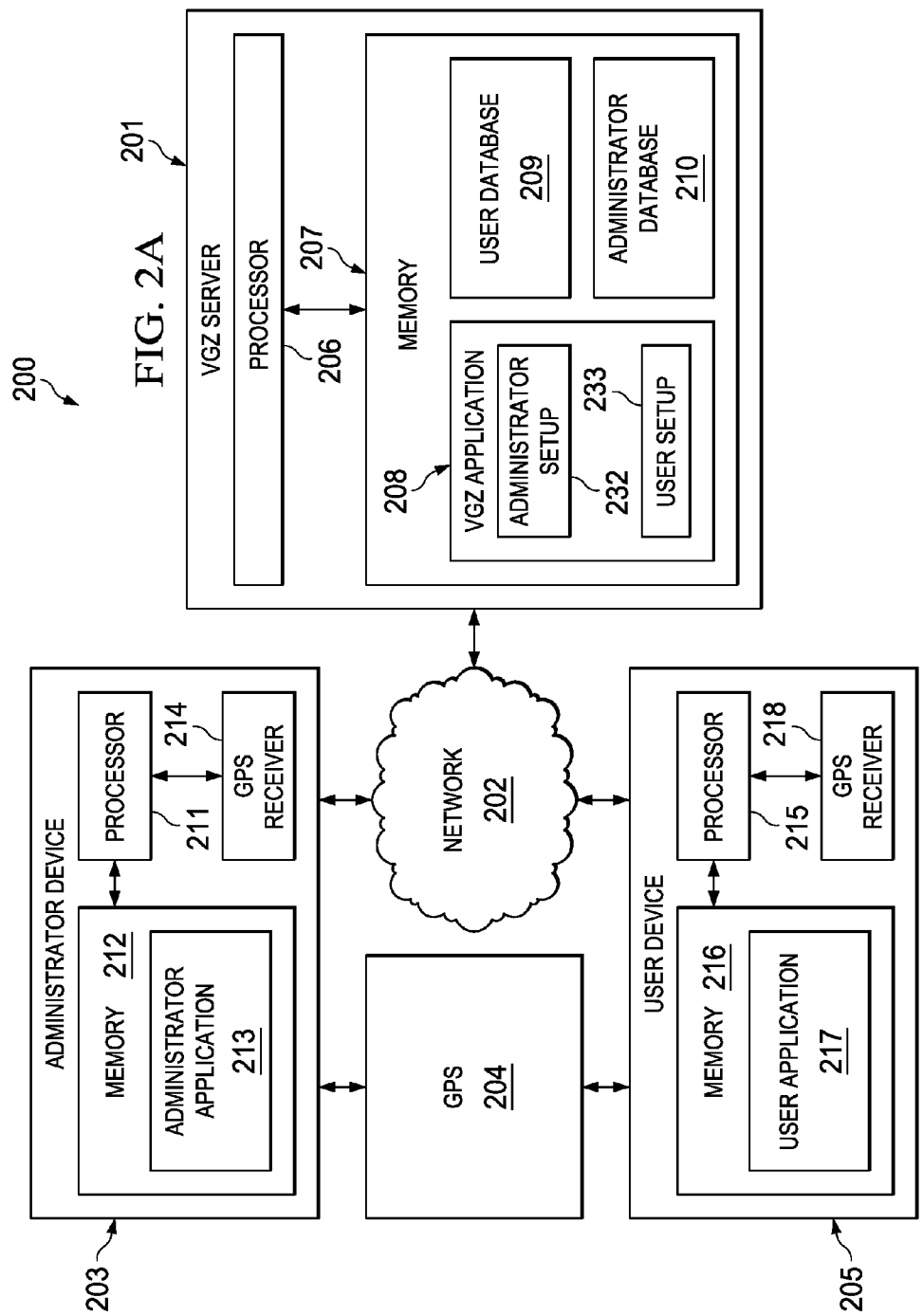

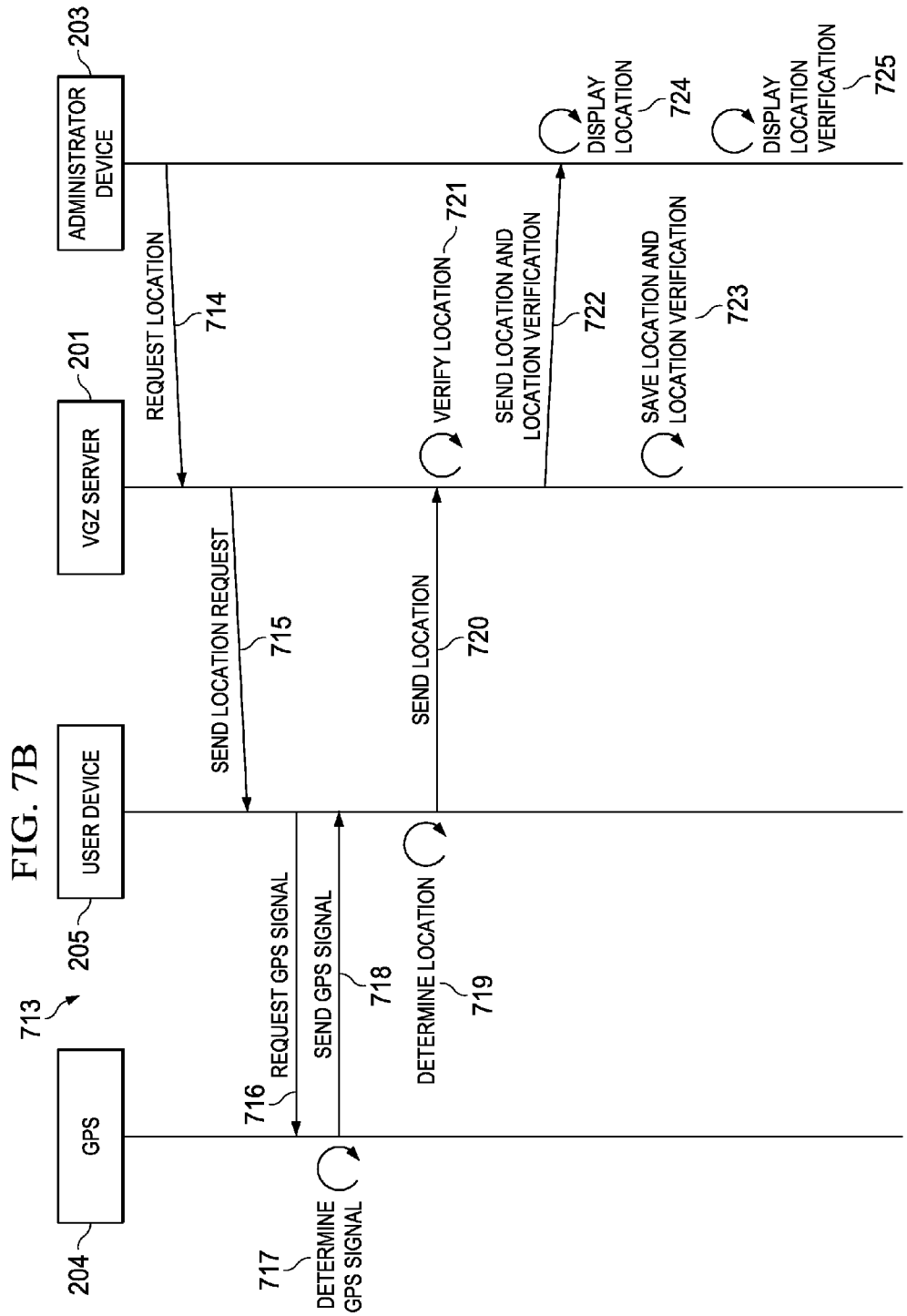

SYSTEM AND METHOD FOR USER INTERACTION WITH VIRTUAL GEOGRAPHIC ZONES

CROSS-REFERENCE TO RELATED APPLICATION

This application claims priority to U.S. Provisional Application No. 61/662,980, filed Jun. 22, 2012. The patent application identified above is incorporated here by reference in its entirety to provide continuity of disclosure.

FIELD OF THE INVENTION

The present invention relates to communications, namely electrical and telecommunications. More particularly, the present invention relates location-based data processing.

BACKGROUND OF THE INVENTION

As wireless devices proliferate, including smartphones and tablet computers, marketers are facing increasing competition for the attention of consumers. For example, the television industry has recently started using mobile phones to drive live television viewing through mobile phones. In 2012, 86% of Americans use their mobile phone while watching television. As a result, marketers have increased the amount spent on online advertising attempting to reach mobile phone users through advertising. From 2011 to 2012, marketers have increased online advertising spending by 21.7% compared to an increase in spending of only 4.5% for television advertising. However, difficulties in reaching a target consumer base remain prevalent because mobile phone users are not constantly browsing online.

With the increase in technological sophistication of wireless devices over time, marketers have attempted to find a solution in the prior art to target consumers using wireless devices with limited success. For example, U.S. Pat. No. 7,321,773 to Hines, et al. discloses an area watcher wireless feature with a database of geographic areas triggering the wireless area watcher to display a message upon particular wireless device's entry into or exit from a watched area. A watched area is defined by a postal code, principality, state or country, or by a particular cell site area. The area watcher wireless feature is implemented into a wireless service provider's network to watch the wireless device. However, the system in Hines relies on the infrastructure of a wireless network service provider to implement the watcher feature and to define the watched areas leading to an expensive system that cannot be customized.

U.S. Pat. No. 7,995,996 to Link, et al. discloses providing target advertisements over wireless network from local advertisers pre-registered to advertise. Local advertisers register to advertise on wireless devices that are in close proximity to the advertiser. As a consumer enters a cell site that is near the location of the local advertiser, the wireless network delivers a message to the wireless device of the consumer that is specified by the local advertiser. However, the system in Link relies on the location and the range of cellular towers leading to an inaccurate location of the wireless device. Further, such reliance on the range of the cellular towers results in fixed areas within which the consumer must be and cannot be customized to suit the local advertiser.

WIPO Patent Publication No. 2010/078616 to Wood, et al. discloses a mobile device managing arrangement for service and product information by a wireless fidelity network through hand-held devices interacting with a precinct database. In Wood, the precinct database stores vendors, products, services, and information for each precinct. A precinct is a predefined region in which a customer with the mobile device can access information about the vendors, products, services within the precinct. The precinct is equipped with proximity short range wireless equipment, in the form of a pad or a gate. In order to access the information from the precinct database, the customer must place the mobile device within the range of the proximity pad or gate to access the information. However, the system in Wood relies on the wireless fidelity network and a cellular network to locate the mobile device leading to an inaccurate location because the range of the wireless fidelity network and the range of the cellular network cannot conform to the shape of the building in which the customer is desired to be located and cannot be customized. Further, the wireless fidelity network for the determination of the location can be compromised through the use of a wireless fidelity network repeater to extend the reach of the network to unauthorized areas.

Referring to FIG. 1, in a prior art example of a "proximity system" is shown. The prior art proximity systems have several limitations. Building 150 has perimeter 151. Wi-Fi router 152 is mounted in building 150 and has range 153. One limitation is that coverage of range 153 is indistinct and varies around perimeter 158. Further, some areas are exclusion. For example, areas 156 and 157 are not covered by range 153 of Wi-Fi router 152. Further, undesired reception of the Wi-Fi signal occurs. For example, Wi-Fi repeater 154 broadcasts repeater range 155. This is a problem because wireless device 159 is able to access range 153 of Wi-Fi router 152 through Wi-Fi repeater 154 hence providing coverage beyond what is intended. Further, range 153 cannot be precisely determined due to the "fuzziness" of range 153, thereby allowing an unintended user of wireless device 159 to access range 153 of Wi-Fi router 152 by being in close proximity to range perimeter 158.

The prior art fails to disclose or suggest a system and method for creating customizable virtual geographic zones to enable administrators to accurately interact with users. Therefore, there is a need in the prior art for a system and method for creating accurate virtual geographic zones that cannot be compromised to allow an administrator to inexpensively and accurately interact with users.

SUMMARY

In a preferred embodiment, a system and method for message delivery to a user is disclosed. The system includes a network, a server connected to the network, an administrator device receiving information from a global positioning system and connected to the network, a user device receiving information from the global positioning system and connected to the network.

In a preferred embodiment, an administrator defines a set of virtual geographic zones and sub-zones in which the user device is tracked, and saves the set of virtual geographic zones and sub-zones to an administrator account on the server. The user downloads a user application, sets up a user account that includes a user ID and a verification, and downloads the set of virtual geographic zones and sub-zones. As the user moves into and out of the virtual geographic zones and sub-zones, the location of the user device is determined and a set of administrator-defined actions are executed by the user application on the user device based on the location of the user device.

In one embodiment, the set of administrator-defined actions is a set of advertisements that are displayed on the user device based on the location of the user device. In another embodiment, the set of administrator-defined actions is a set of discount coupons for products and services of the administrator to be redeemed at a point-of-sale based on the location of the user device. In this embodiment, the set of discount coupons are displayed on the user device when the user enters a retail store zone of the administrator. In another embodiment, as the user moves through each sub-zone of a retail store zone of the administrator, information about various products located in each sub-zone, including a location of each product, is displayed on the user device as the user moves through each sub-zone.

In another embodiment, the set of actions is a retail store event, during which the user must be present to win a prize. In this embodiment, the user must locate a predetermined sub-zone of the administrator within a predetermined time period in order to redeem the prize. The user application determines the location and time of the user device and sends the location and time to the server. The administrator may monitor the location of the user in real-time.

In one embodiment, the user application intermittently monitors the location of the user device at a predetermined frequency in real-time to determine an engagement of the user device with the zone, i.e., if the user device is at, within, or nearby the boundary of the zone. In this embodiment, the user application determines a predicted path for the user device relative to velocity of the user device, determines a zone equation for the zone, compares the predicted path to the zone equation, and the engagement of the predicted path with the zone equation is determined from the comparison.

In one embodiment, a polygonal zone is deployed which clearly distinguishes from the proximity based systems of the prior art.

BRIEF DESCRIPTION OF THE DRAWINGS

The disclosed embodiments will be described with reference to the accompanying drawings.

FIG. 2A is a schematic of a virtual geographic zone system of a preferred embodiment.

FIG. 7B is a flowchart of a method for verifying and monitoring a user location for an administrator application of a preferred embodiment.

DETAILED DESCRIPTION

Figure 1:
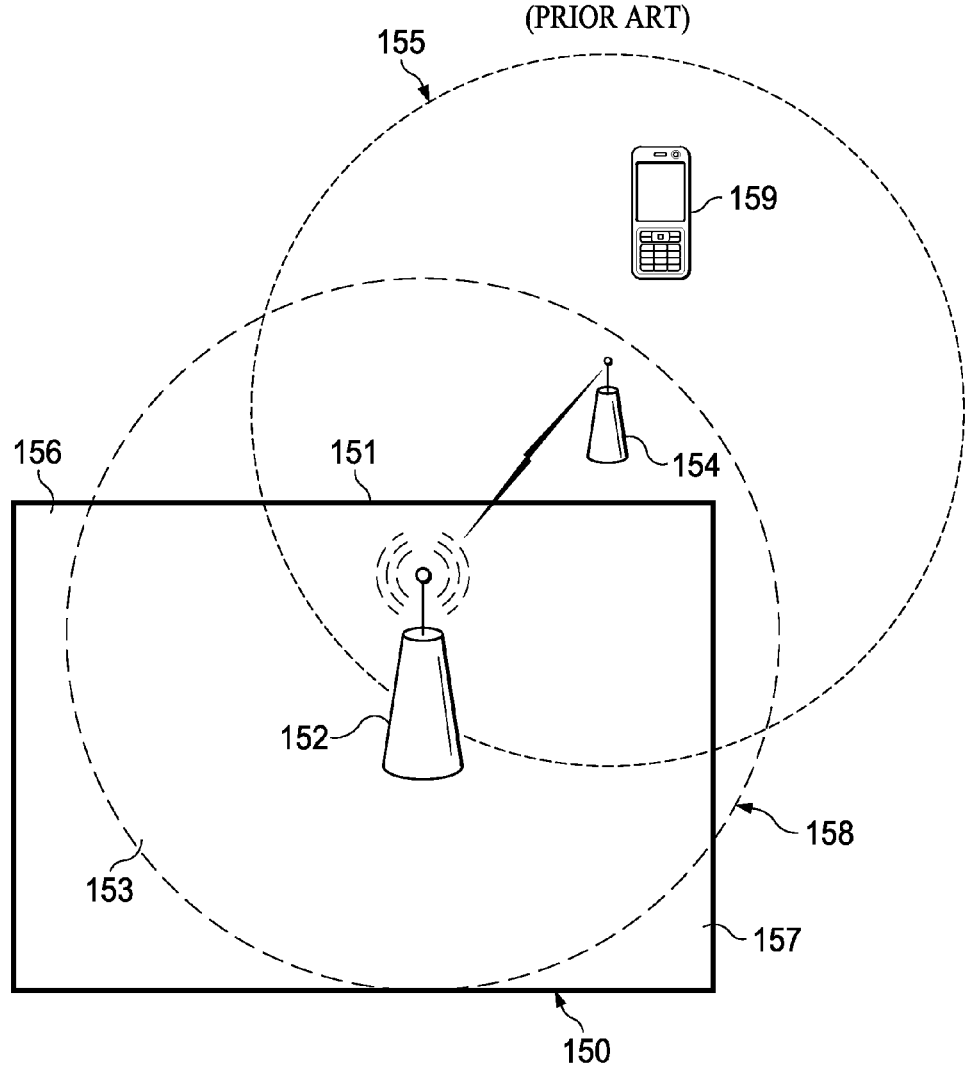
FIG. 1 is a schematic of a Wi-Fi-based access control of the prior art.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, Objective C, C++, C#, VB.NET, Python or the like, conventional procedural programming languages, such as the "C" programming language, Visual Basic, Fortran 2003, Perl, COBOL 2002, PHP, ABAP, dynamic programming languages such as Python, PHP, HTML, AJAX, Ruby and Groovy, or other programming languages. The program code may execute entirely on a user device, partly on the user device, entirely on an administrator device, partly on the administrator device, as a stand-alone software package, partly on the user device and partly on a network server, partly on the administrator device and partly on the network server, or entirely on the network server. In the network server scenario, the network server may be connected to the user device and/or the administrator device through any type of network, including a local area network ("LAN") or a wide area network ("WAN"), or the connection may be made to an external computer connected to the user device or the administrator device (for example, through the Internet using an Internet Service Provider) or in a cloud computing environment or offered as a service such as a Software as a Service ("SaaS").

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 2A, system 200 includes virtual geographic zone ("VGZ") server 201 connected to network 202, administrator device 203 connected to network 202 and receiving information from global positioning system ("GPS") 204, and user device 205 connected to network 202 and receiving information from GPS 204.

VGZ server 201 includes processor 206 and memory 207 connected to processor 206. VGZ application 208, user database 209, and administrator database 210 are stored in memory 207. VGZ application 208 has administrator set-up 232 and user set-up 233 that will be further described below. Processor 206 executes VGZ application 208.

Administrator device 203 includes processor 211, memory 212 connected to processor 211, and GPS receiver 214 connected to processor 211. Administrator application 213 is stored in memory 212 and processor 211 executes administrator application 213.

User device 205 includes processor 215, memory 216 connected to processor 215, and receiving information from GPS receiver 218 connected to processor 215. User application 217 is stored in memory 216 and processor 215 executes user application 217.

It will be appreciated by one of ordinary skill in the art that any navigation system may be employed to determine the location of administrator device 203 and user device 205.

In a preferred embodiment, an administrator associated with administrator device 203 interacts with a user associated with user device 205 using messages, communications, advertisements and services as will be further described below.

In a preferred embodiment, administrator device 203 is a smartphone. In another embodiment, administrator device 203 is a personal computer. In another embodiment, administrator device 203 is a tablet computer. Other suitable computer devices known in the art may be employed.

In a preferred embodiment, user device 205 is a smartphone. In another embodiment, user device 205 is a personal computer. In another embodiment, user device 205 is a tablet computer. Other suitable computer devices known in the art may be employed.

In one embodiment, administrator application 213 is a computer application executed on a personal computer. In another embodiment, administrator application 213 is a mobile application executed on a smartphone or tablet computer. In another embodiment, administrator application 213 is a web application executed through an Internet browser.

In one embodiment, user application 217 is a computer application executed on a personal computer. In another embodiment, user application 217 is a mobile application executed on a smartphone or tablet computer. In another embodiment, user application 217 is a web application executed through an Internet browser.

In a preferred embodiment, VGZ application 208 is a computer application executed by processor 206 of VGZ server 201. In this embodiment, VGZ application 208 is a set of machine code instructions that receives and examines data from administrator device 203 and user device 205, saves and retrieves data to and from user database 209 and/or administrator database 210 as will be further described below.

In one embodiment, network 202 is a cellular network providing a data connection to the Internet.

In another embodiment, network 202 is a local Wi-Fi network providing a data connection to the Internet. In another embodiment, network 202 is a local network connected to VGZ server 201.

In one embodiment, each of user device 205 and administrator device 203 accesses GPS 204 through a GPS repeater as will be further described below.

Figure 2B:
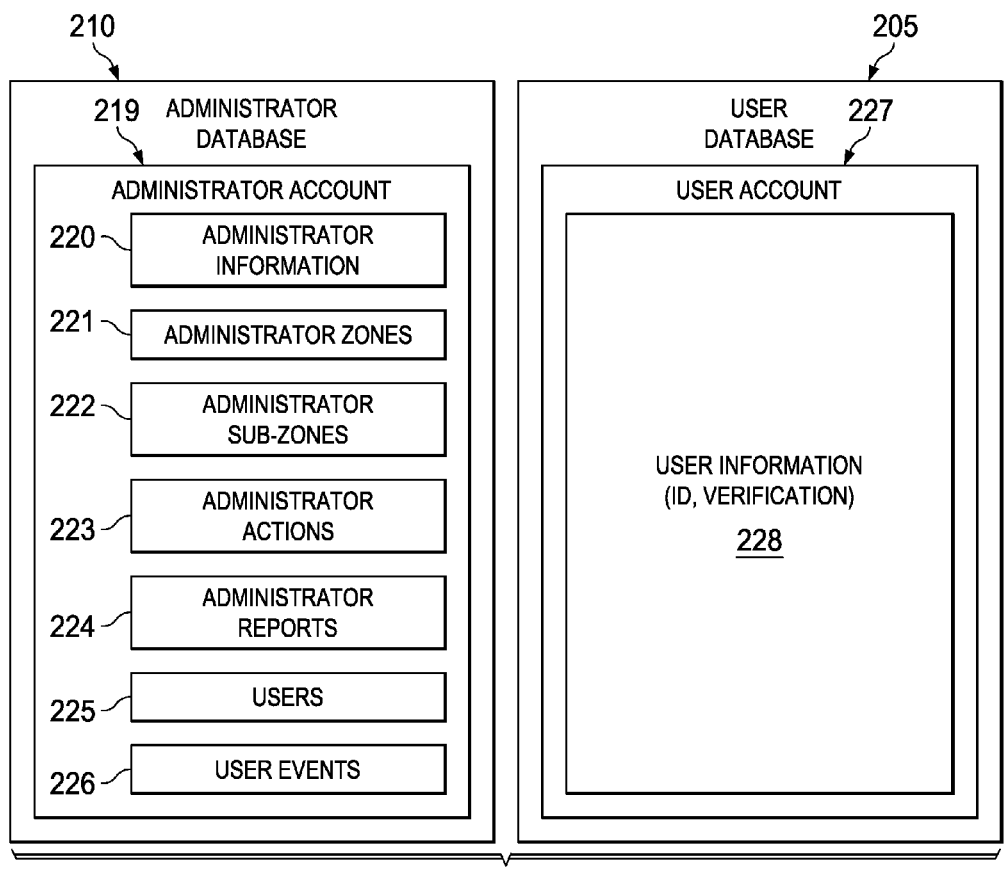
FIG. 2B is a schematic of an administrator database and a user database of a virtual geographic zone system of a preferred embodiment.

Referring to FIG. 2B, administrator database 210 includes a plurality of administrator accounts 219. Each administrator account 219 includes administrator information 220, administrator zones 221, administrator sub-zones 222, administrator actions 223, administrator reports 224, users 225, and user events 226.

As used in this application, the term "zone" is a geographic area of any size where an administrator may track the location of user device 205. The zone can be any graphical two or three dimensional solid polygon whose sides are determined by geographic points, i.e., latitude, longitude and altitude. A time period may be added to the zone by the administrator to track user device 205 in the zone during a predetermined time period. The zone type can be "inclusion" where predetermined actions are permitted or "exclusion" where predetermined actions are prohibited. A set of zones are defined and saved by an administrator using administrator device 203 as administrator zones 221 as will be further described below.

As used in this application, the term "sub-zone" is a geographic area of any size within a zone where an administrator may track the location of user device 205. The sub-zone can be any graphical two or three dimensional solid polygon whose sides are determined by geographic points, i.e., latitude, longitude and altitude. A time period may be added to the sub-zone by the administrator to track user device 205 in the sub-zone during a predetermined time period. The subzone type can be "inclusion" where predetermined actions are permitted or "exclusion" where predetermined actions are prohibited. A set of sub-zones are defined and saved by an administrator using administrator device 203 as administrator sub-zones 222 as will be further described below.

As used in this application, the term "action" is a predetermined function of user application 217 to be executed or to be prohibited from being executed based on the location of the user device relative to a zone or sub-zone as defined by the administrator. In one embodiment, the action is a coupon redeemable at a point-of-sale based on the location of the user device. In another embodiment, the action is an advertisement for display on a user device based on the location of the user device. In this embodiment, the advertisement can be in any combination of an audio, video, pictorial, or graphical format. In another embodiment, the action is a store event based on the location of the user device during which a user must be present in order to receive a prize. In other embodiments, any predetermined function can be defined as an action. A set of actions are defined and saved by the administrator using administrator device 203 as administrator actions 223 as will be further described below.

In a preferred embodiment, administrator information 220 includes an administrator name, an administrator ID, and an administrator verification of an administrator using administrator device 203.

In one embodiment, the administrator verification is an alphanumeric password. In another embodiment, the administrator verification is a facial recognition. In another embodiment, the user verification is a fingerprint identification.

As used in this application, a "user event" is a log entry of a user location sent to the VGZ server sent by the user device. Each of user events 226 is saved into the administrator account of the zone. User events 226 can be queried for an administrator report.

Users 225 is a list of users that have received the actions of the zone from the administrator. Users 225 can be queried for an administrator report.

Administrator reports 224 is a set of saved queries that an administrator can execute to retrieve information.

User database 209 includes a plurality of user accounts 227. Each user account 227 includes user information 228. In a preferred embodiment, user information is a user ID and a user verification.

In one embodiment, the user verification is an alphanumeric password. In another embodiment, the user verification is a facial recognition. In another embodiment, the user verification is a fingerprint identification.

Figure 3A:
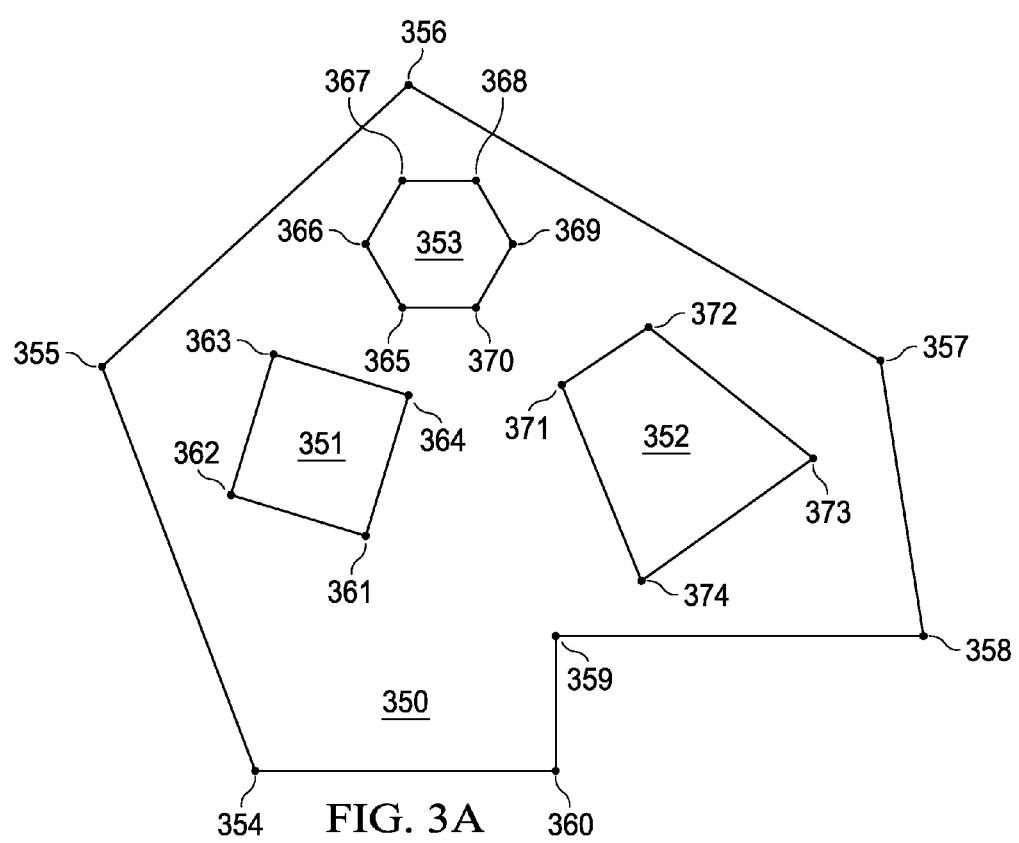
FIG. 3A is a plan view of zones of a preferred embodiment of the disclosure.

Referring to FIG. 3A, various zones will be described. Zone 350 is comprised of a polygonal shape having numerous vertices 354, 355, 356, 357, 358, 359 and 360. The vertices form a closed loop which can be any shape and have any number of vertices. Zone 350 is an area in which "actions" are sent to a user by the system.

Zone 350 includes sub-zones 351, 352 and 353. Sub-zone 351 is comprised of a perimeter including vertices 361, 362, 363 and 364. The vertices form a closed loop which can be any shape and have any number of vertices. Sub-zone 351 can have any number of vertices and comprise any shape, so long as it is inside zone 350. In the system, sub-zone 351 receives a sub-set of actions sent to the user in zone 350.

Zone 350 includes "exclusion" sub-zone 353. Exclusion sub-zone 353 is an area bounded by a perimeter formed from 365, 366, 367, 368, 369 and 370. Exclusion sub-zone 353 can have any number of vertices and comprise any shape, so long as it is inside zone 350. An "exclusion" sub-zone is a sub-zone in which a sub-set of actions sent to zone 350 are exclusion so long as the user is within it.

"Hot zone" 352 is a sub-zone of zone 350 and is a perimeter formed by vertices 371, 372, 373 and 374. Hot zone 352 can have any number of vertices and comprise any shape, so long as it is inside zone 350. A "hot zone" is a sub-zone in which actions are actually being sent to a user.

Figure 3B:
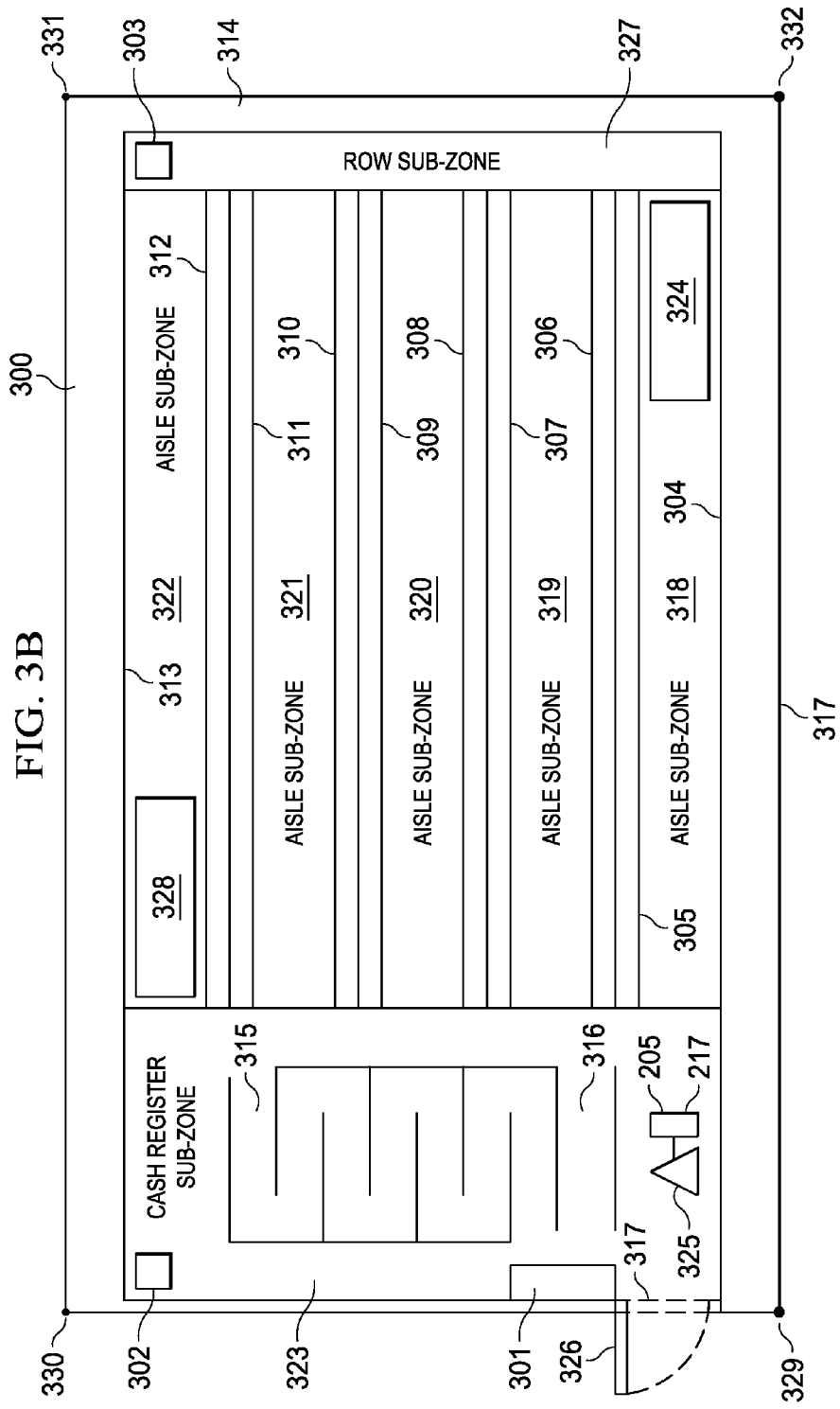
FIG. 3B is a plan view of a virtual geographic zone and sub-zones of a preferred embodiment.

Referring to FIG. 3B, an example of a preferred deployment of the system is described. Retailer 300 includes cash register 301, GPS repeater 302 mounted within retailer 300 and product shelves 304, 305, 306, 307, 308, 309, 310, 311, 312, 313, and 314 positioned within retailer 300. Priority check-out line 316 is adjacent to cash register 301. Check-out line 315 is adjacent to priority check-out line 316. In one embodiment, Wi-Fi access point 303 is mounted within retailer 300. Of course, other deployments in different locations are possible.

Store zone 317 surrounds retailer 300. Aisle sub-zone 318 is positioned between product shelves 304 and 305. Aisle sub-zone 318 is positioned between product shelves 304 and 305. Aisle sub-zone 319 is positioned between product shelves 306 and 307. Aisle sub-zone 320 is positioned between product shelves 308 and 309. Aisle sub-zone 321 is positioned between product shelves 310 and 311. Aisle sub-zone 322 is positioned between product shelves 312 and 313. Row sub-zone 327 is adjacent to product shelf 314. Cash register sub-zone 323 is adjacent to door 326 and cash register 301 and surrounds check-out line 315 and priority check-out line 316. Hot zone sub-zone 324 is positioned within aisle sub-zone 318 adjacent row sub-zone 327. Exclusion sub-zone 328 is positioned within aisle sub-zone 322.

In a preferred embodiment, each boundary of store zone 317, cash register sub-zone 323, aisle sub-zone 318, aisle sub-zone 319, aisle sub-zone 320, aisle sub-zone 321, aisle sub-zone 322, cash register sub-zone 323, hot zone sub-zone 324, row sub-zone 327, and exclusion sub-zone 328 is defined by an administrator as will be further described below. In one embodiment, store zone 317 is defined by recording points 329, 330, 331, and 332 of store zone 317 as will be further described below.

User 325 has user device 305 running user application 217. User device 205 is in wireless communication with GPS repeater 302 to determine the location of user device 205 as will be further described below.

In one embodiment, user device 205 is possessed by the user. In another embodiment, user device 205 is possessed by an administrator and "loaned" to the user by the administrator.

As user 325 moves in and out of store zone 317, cash register sub-zone 323, aisle sub-zone 318, hot zone sub-zone 324, aisle sub-zone 319, aisle sub-zone 320, aisle sub-zone 321, aisle sub-zone 322, row sub-zone 327, the location of user device 305 is tracked as will be further described below. Predetermined actions of user application 217 based on the location of user device 205 are executed or prohibited from being executed as will be further described below.

In one embodiment, as user 325 moves through each of aisle sub-zones 318, 319, 320, 321, and 322, and row sub-zone 327 information about products, including the price, specifications, and the location of the products on shelves adjacent to each of aisle sub-zones 318, 319, 320, 321, and 322, and row zone 327, discount coupons for the purchase of the products located in each of aisle sub-zones 318, 319, 320, 321, and 322, and row zone 327 are displayed actions on user device 205 by user application 217.

In another embodiment, as user 325 moves into hot zone sub-zone 324 user application 217 displays the status of a store event action on user device 205. In this embodiment, the status of the store event action is based on a predetermined time within which user 325 and user device 205 engage with, i.e., at or within, the boundary of hot zone sub-zone 324.

In one embodiment, hot zone sub-zone 324 is "exclusion." In an "exclusion" zone, all actions are deactivated except for actions related to store events. In another embodiment, hot zone sub-zone 324 is "inclusion" and allows other actions, including information about products, including the price, specifications, and the location of the products on shelves adjacent to each of aisle sub-zones 318, 319, 320, 321, and 322, and row zone 327, discount coupons for the purchase of the products located in each of aisle sub-zones 318, 319, 320, 321, and 322.

In one embodiment, an administrator can verify and monitor the location of user device 205 in store zone 317 as will be further described below.

In another embodiment, as user 325 moves into cash register sub-zone 323, user application 217 determines whether user 325 can access priority check-out line 316 or must use check-out line 315 and displays the determination on user device 205. In one embodiment, the determination of whether user 325 can access priority check-out line 316 is based on a predetermined amount of money user has spent at store 300. In another embodiment, the determination of whether user 325 can access priority check-out line 316 is based on a predetermined amount of time user has been a customer of store 300.

In one embodiment, exclusion sub-zone 328 is sub-zone in which the administrator can decline to send actions to a user. In this embodiment actions may be prohibited by law or other limitations so that actions which would otherwise be delivered to the user are not delivered. Instead of an action, a message may be sent to the user regarding the prohibited zone and its boundaries.

Figure 4A:
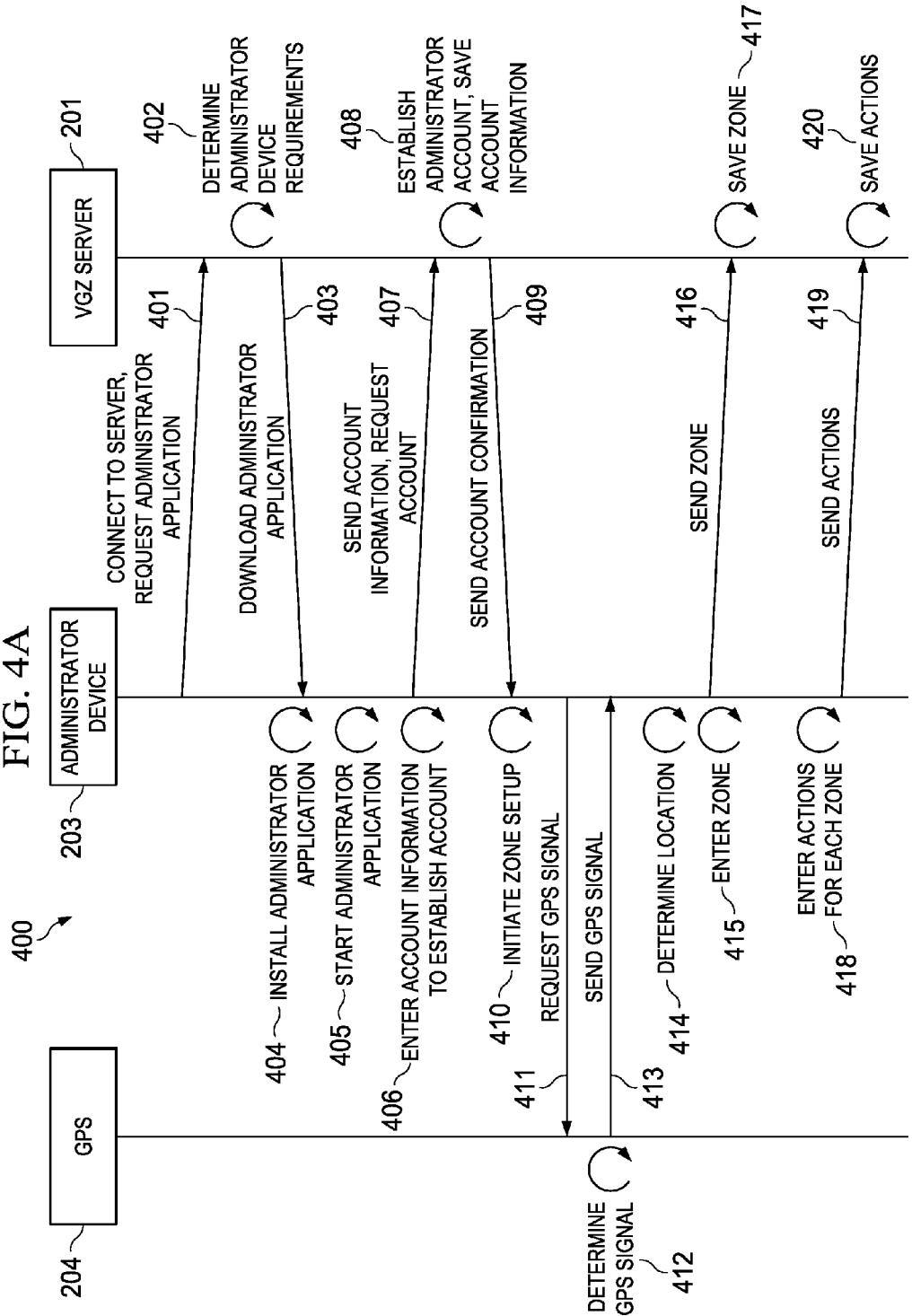
FIG. 4A is a flowchart of an administrator set-up method of a preferred embodiment.

Referring to FIG. 4A, administrator set-up method 400 for an administrator application using a VGZ application will be described. In step 401, administrator device 203 connects to VGZ server 201 and requests the administrator application. In step 402, the VGZ application determines the requirements of administrator 402. In step 403, the administrator application is downloaded to administrator device 203. In step 404, administrator device 203 installs the administrator application. In step 405, administrator device 203 starts the administrator application. In step 406, a set of administrator account information is entered into administrator device 203 to establish an administrator account. In step 407, administrator device 203 sends the set of administrator account information to VGZ server 201 to request the administrator account. In step 408, the VGZ application establishes an administrator account by saving the administrator account information into an administrator database. In step 409, VGZ server 201 sends an account confirmation to administrator device 203.

In step 410, the administrator application initiates a zone set-up function to establish and define each zone or sub-zone as will be further described below. In step 411, the administrator application requests a GPS signal from GPS 204. In step 412, GPS 204 determines the GPS signal that includes the position of the GPS satellite at the time the GPS signal is to be sent and the time at which the GPS signal is sent. In step 413, the GPS signal is sent to administrator device 203. In step 414, administrator device 203 determines its location from the GPS signal. In step 415, longitudinal, latitudinal, and altitudinal coordinates of a set of zones and/or a set of sub-zones are entered into administrator device 203.

Figure 4B:
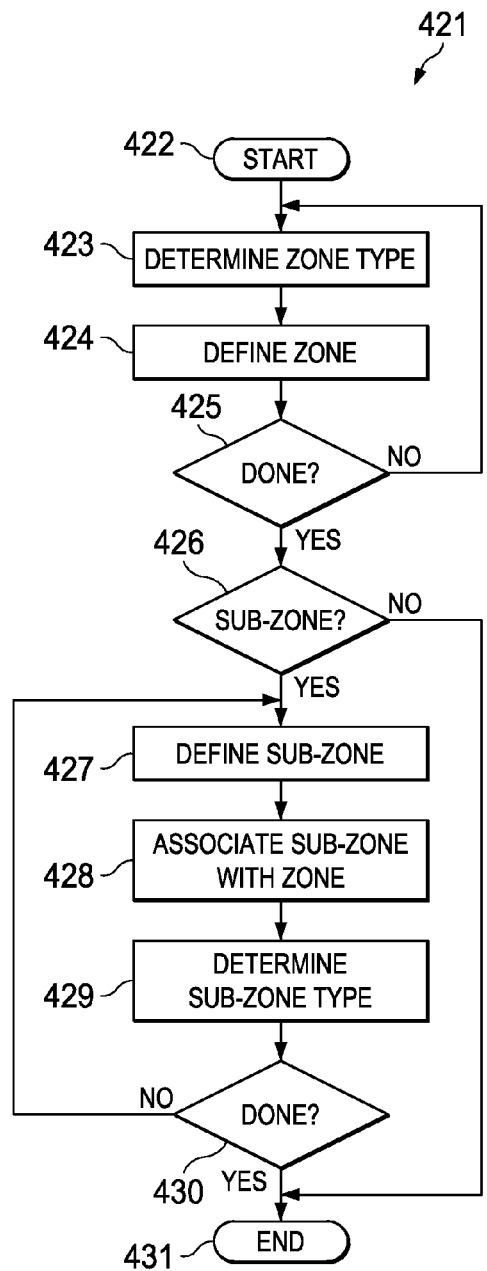
FIG. 4B is a flowchart of a method for establishing a zone or a sub-zone of a preferred embodiment.
Figure 4C:
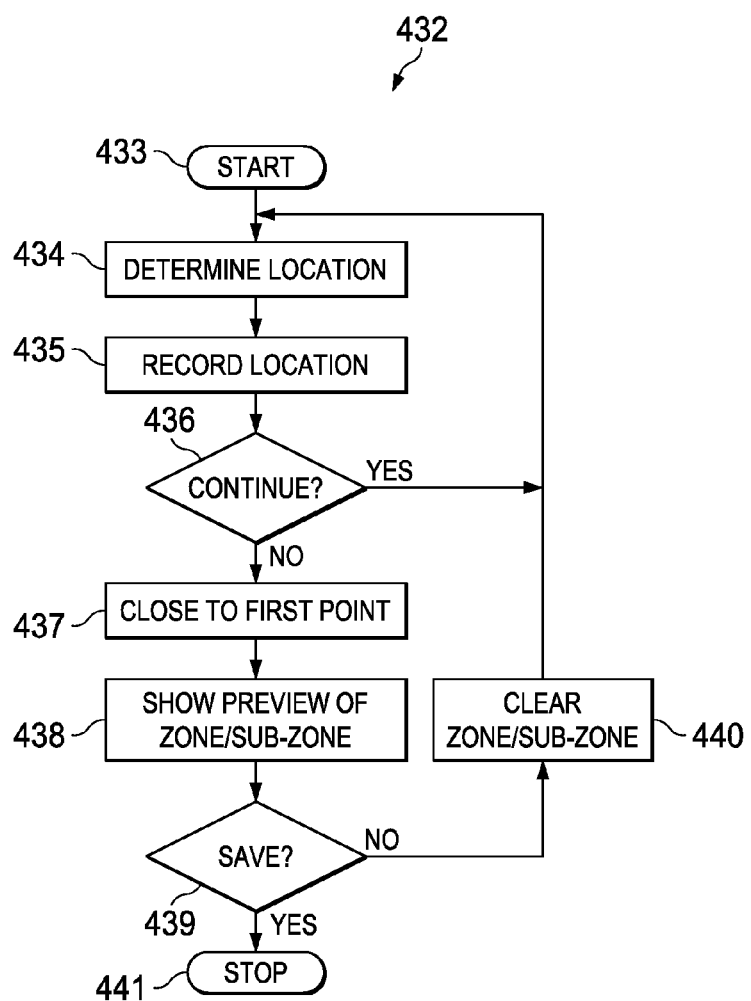
FIG. 4C is a flowchart of a method for defining a zone or sub-zone of a preferred embodiment.

In a preferred embodiment, steps 411, 412, 413, 414, and 415 are repeated to establish and define points of a polygonal zone or a sub-zone as will be further described in FIGS. 4B and 4C.

In step 416, the saved set of zones and/or sub-zones is sent to VGZ server 201. In step 417, VGZ server 201 saves the sets of zones and/or sub-zones into the administrator account. In step 418, an action for each zone and sub-zone is entered. In step 419, the entered action is sent to VGZ server 201. In step 420, VGZ server 201 saves each action.

Referring to FIG. 4B, method 421 for establishing a zone and a sub-zone is described in further detail. Method 421 starts at step 422. In step 423, a zone type is determined, i.e., whether the zone is "inclusion" or "exclusion." In step 424, the determined zone is defined. In step 425, whether all zones have been established is determined. If all zones have not been established, then method 421 returns to step 423. If all zones have been established, then method 421 proceeds to step 425. In step 426, whether a sub-zone needs to be established is determined. If no sub-zones need to be established, then method 421 ends in step 431. If a sub-zone needs to be established, then the sub-zone is defined in step 427. In step 428, the sub-zoned is associated with the zone. In step 429, a sub-zone type is determined for the sub-zone, i.e., whether the sub-zone is inclusion or exclusion. In step 430, whether all sub-zones have been established is determined. If all sub-zones have not been established, then method 421 returns to step 427. If all sub-zones have been established, then method 421 ends in step 431. Steps 424 and 427 are performed as will be further described in FIG. 4C.

Referring to FIG. 4C, method 432 for defining a polygon for a zone or sub-zone is described in further detail. Method 432 starts at step 433. In step 434, a point location of the administrator device is determined as previously described. In step 435, the determined point location is recorded in the administrator device. In step 436, a decision is made as to whether or not to record additional points as corners of the polygon referencing a zone or subzone. If additional points are to be recorded, then method 432 returns to step 434. In a preferred embodiment, the administrator moves along a desired path and determines and records the set of point locations. The set of point locations are endpoints for sides of a polygon for the zone or sub-zone. In this embodiment, the administrator ends the determination and recording of the set of point locations at the last point location along the desired path and the polygon is closed to the first point.

If no additional points are to be recorded then the process moves to step 437. In step 437, the polygon is closed to the first point location.

In step 438, the determined zone or sub-zone is displayed as a preview. In step 439, whether the displayed zone or sub-zone is to be saved into memory is determined. If not saved into memory, then the displayed zone or sub-zoned is cleared in step 440 and method 432 returns to step 434. If the displayed zone or sub-zone is saved into memory, then method 432 ends in step 441.

Figure 5A:
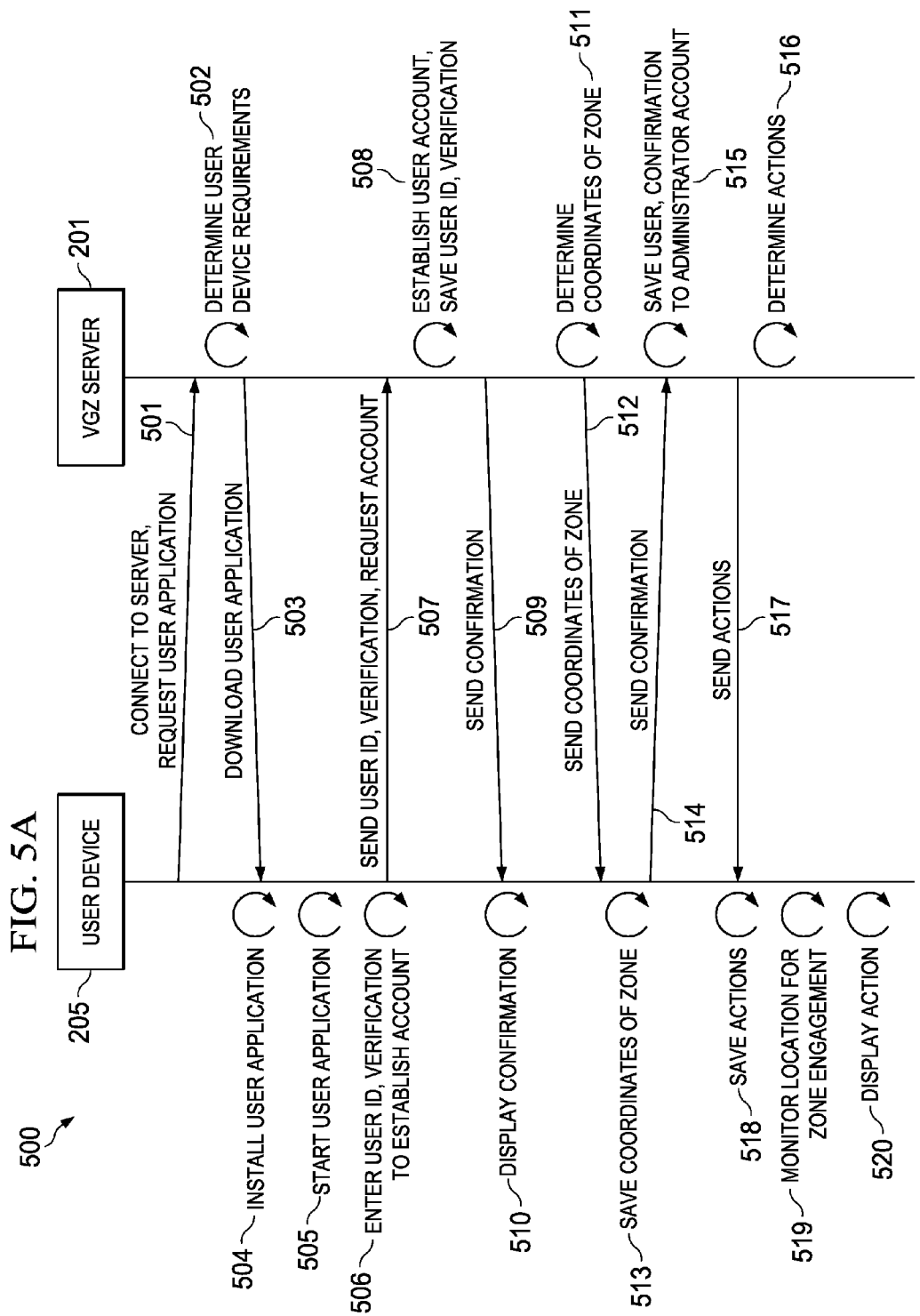
FIG. 5A is a flowchart of a user set-up method of a preferred embodiment.

Referring to FIG. 5A, user set-up method 500 for a user application using a VGZ application is described. In step 501, user device 205 connects to VGZ server 201 and requests the user application. In step 502, the requirements of user device 205 are determined. In step 503, the user application is downloaded. In step 504, the user application is installed. In step 505, the user application is started. In step 506, a set of user information that includes a user ID and a user verification is entered into the user application to establish a user account. In step 507, the set of user information is sent to VGZ server 201 and to request the user account. In step 508, VGZ application 208 establishes the user account by saving the set of user information in the user database. In step 509, VGZ server 201 sends a confirmation to user device 205. In step 510, the confirmation is displayed on user device 205.

In step 511, the coordinates of a set of zones are determined from each administrator account of each zone of the set of zones. In step 512, the coordinates of the set of zones are sent to user device 205. In step 513, user device 205 saves the coordinates of the set of zones into memory. In step 514, a confirmation is sent to VGZ server 201. In step 515, VGZ server 201 saves the user to each of the administrator accounts for each zone. In step 516, the actions for each zone are determined from the administrator database. In step 517, the actions for each zone are sent to user device 205. In step 518, the actions for each zone are saved to the memory of user device 205. In step 519, the user application on user device 205 monitors the location of user device 205 at predetermined time intervals in order to determine if the user device engages, i.e., is near, at, or within a zone, as will be further described in FIG. 5B. In a preferred embodiment, a user associated with user device 205 can activate the intermittent monitoring of the location of user device 205 in step 519 at any time. In this embodiment, any zone may be discoverable as will be further described in FIG. 5B. In step 520, if user device 205 engages, i.e., is at or within the zone, then the actions for the engaged zone are displayed on user device 205.

Figure 5B:
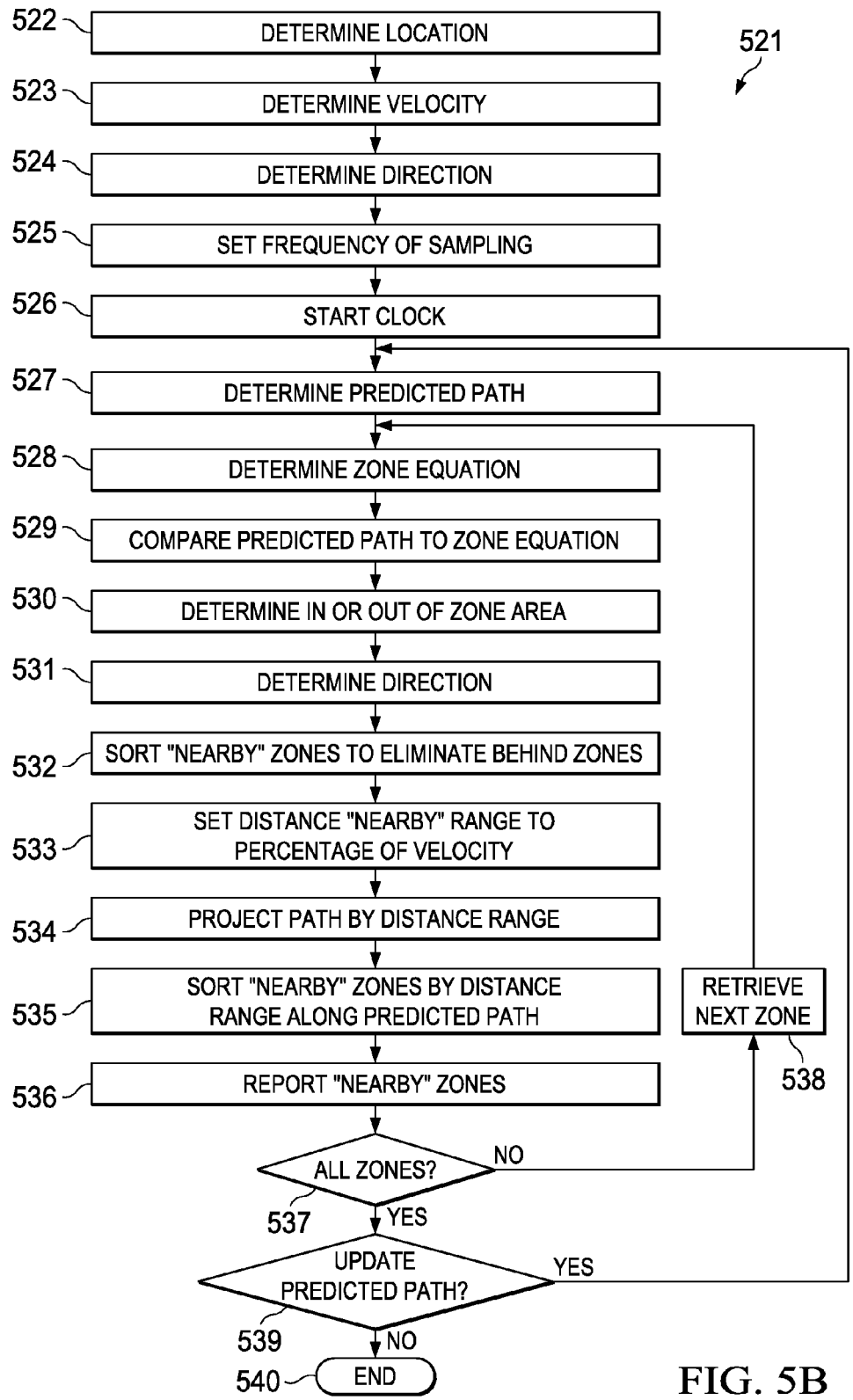
FIG. 5B is a flowchart of a method for monitoring user location for zone engagement of a preferred embodiment.

Referring to FIG. 5B, method 521 for monitoring a location of a user device to determine an engagement of the user device with a zone is described in further detail. In step 522, a location of the user device is determined as previously described. In step 523, a velocity of the user device is determined. In a preferred embodiment, the velocity of the user device is determined by determining a set of locations and a time period between a first location and a second location. In this embodiment, each position n is a set of latitudinal, longitudinal pairs $(x_n, y_n)$. In this embodiment, velocity is calculated by:

$$v_n = \frac{\Delta d_n}{\Delta t_n}$$ Eq. 1

$$\Delta d_n = \sqrt{(x_n - x_{n-1})^2 + (y_n - y_{n-1})^2}$$ Eq. 2 where $v_n$ is the velocity of the user device, $\Delta d_n$ is the distance from location $(x_{n-1}, y_{n-1})$ to location $(x_n, y_n)$, and $\Delta t_n$ is the time period between the determination of location $(x_{n-1}, y_{n-1})$ and location $(x_n, y_n)$. In other embodiments, a plurality of locations is determined, a time period between each of the plurality of locations is determined, and the velocity of the user device is determined using Eq. 1 and Eq. 2.

In step 524, a direction of travel of the user device is determined from the set of locations. In step 525, a frequency of sampling is set. In a preferred embodiment, the frequency of sampling is the frequency with which method 521 determines the location of the user device and a predicted path of the user device as will be further described below.

In step 526, a clock is started to maintain a time constant. In step 527, the predicted path of the user device is determined by plotting a spline of a set of predicted positions $(x_p, y_p)$ of the user device using the set of locations, the velocity at each of the set of locations, and using the following equations:

$$x_p = \frac{1}{2} a_x t^2 + v_{x_o} t = \frac{(v_{x_o} + v_{x_p})t}{2}$$ Eq. 3

$$y_p = \frac{1}{2} a_y t^2 + v_{y_o} t = \frac{(v_{y_o} + v_{y_p})t}{2}$$ Eq. 4 where $x_p$ is the latitudinal distance, $y_p$ is the longitudinal distance, $a_x$ is the latitudinal acceleration, $a_y$ is the longitudinal acceleration, $v_{x_o}$ is the latitudinal velocity at $x_o$, $v_{y_o}$ is the longitudinal velocity at $y_o$, $v_{x_p}$ is the velocity at $x_p$, $v_{y_p}$ is the longitudinal velocity at $y_p$, t is time, and $(x_p, y_p)$ is any point on the predicted path. In one embodiment, the predicted path is sent to the VGZ server. In another embodiment, the predicted path remains on the user device.

In step 528, an equation defining the zone is determined. In a preferred embodiment, the zone equation is a mathematical function that defines the boundary of the zone. In step 529, the predicted path is compared to the zone equation. In one embodiment, each point of the predicted path is compared to points on the boundary of the zone. In one embodiment, each zone has a latitudinal distance $(x_{max}-x_{min})$ and a longitudinal distance $(y_{max}-y_{min})$ and each point p $(x_p, y_p)$ along the predicted path is compared to the zone to determine if point p along the predicted path is at the boundary or within the boundary of the zone. In this embodiment, for each $y_p$ along the predicted path, $x_p$ is compared to $x_{min}$ and $x_{max}$ of the zone to determine whether the following relationship is true:

$$x_{min} \leq x_p \leq x_{max}$$ Rel. 5

In this embodiment, for each $x_p$ along the predicted path, $y_p$ is compared to $y_{min}$ and $y_{max}$ of the zone to determine whether the following relationship is true:

$$y_{min} \leq y_p \leq y_{max}$$ Rel. 6

In this embodiment, if Rel. 5 and Rel. 6 are true, then point $(x_p, y_p)$ of the predicted path engages, i.e., is at or within the boundary of the zone.

In another embodiment, point $(x_p, y_p)$ of the predicted path is compared to the boundary of the zone using $x_{min}$, $x_{max}$, $y_{min}$, $y_{max}$ to determine whether point $(x_p, y_p)$ is within a predetermined distance from the boundary of the zone to determine whether the zone is "nearby."

In step 530, whether the predicted path is at, nearby, or within the zone area is determined from the comparison in step 529. In other methods of determining whether the predicted path engages, i.e., is at, within, or nearby the boundary of the zone, may be employed.

In step 531, the direction of the user device is determined. In step 532, the nearby zone is sorted to eliminate any zone that is behind the user device along the direction of travel. In step 533, a nearby distance range $D_r$ is set to a percentage β of the velocity $v_n$ determined in step 523 by:

$$D_r = v_n \beta$$ Eq. 7

Any percentage can be employed. For example, the percentage can be 20%, 50%, or 75%. If the percentage is 50%, then Eq. 7 becomes:

$$D_r = 0.5 v_n$$ Eq. 8

In step 534, the predicted path is modified so that the predicted path extends at the nearby distance range $D_r$. In step 535, the nearby zones are sorted by the nearby distance range $D_r$ along the predicted path. In step 536, the sorted nearby zones are reported for display.

In step 537, whether each zone has been compared to the predicted path is determined. If each zone has not been compared to the predicted path, then the next zone is retrieved in step 538. Method 521 returns to step 528. If each zone has been compared to the predicted path, then method 521 proceeds to step 539. In step 539, whether the predicted path needs to be updated is determined. In a preferred embodiment, the predicted path is determined at time $t_o$. In this embodiment, the present time is $t_p$. In this embodiment, the time elapsed is:

$$t_e = t_p - t_o \quad \text{Eq. 9}$$

If the time elapsed $t_e$ is greater than a predetermined time period, then method 521 returns to step 527. If the time elapsed $t_e$ is less than or equal to the predetermined time period, then method 521 ends in step 540 and any determined nearby zone is sent from the server to the user device and/or displayed on the user device.

Figure 6:
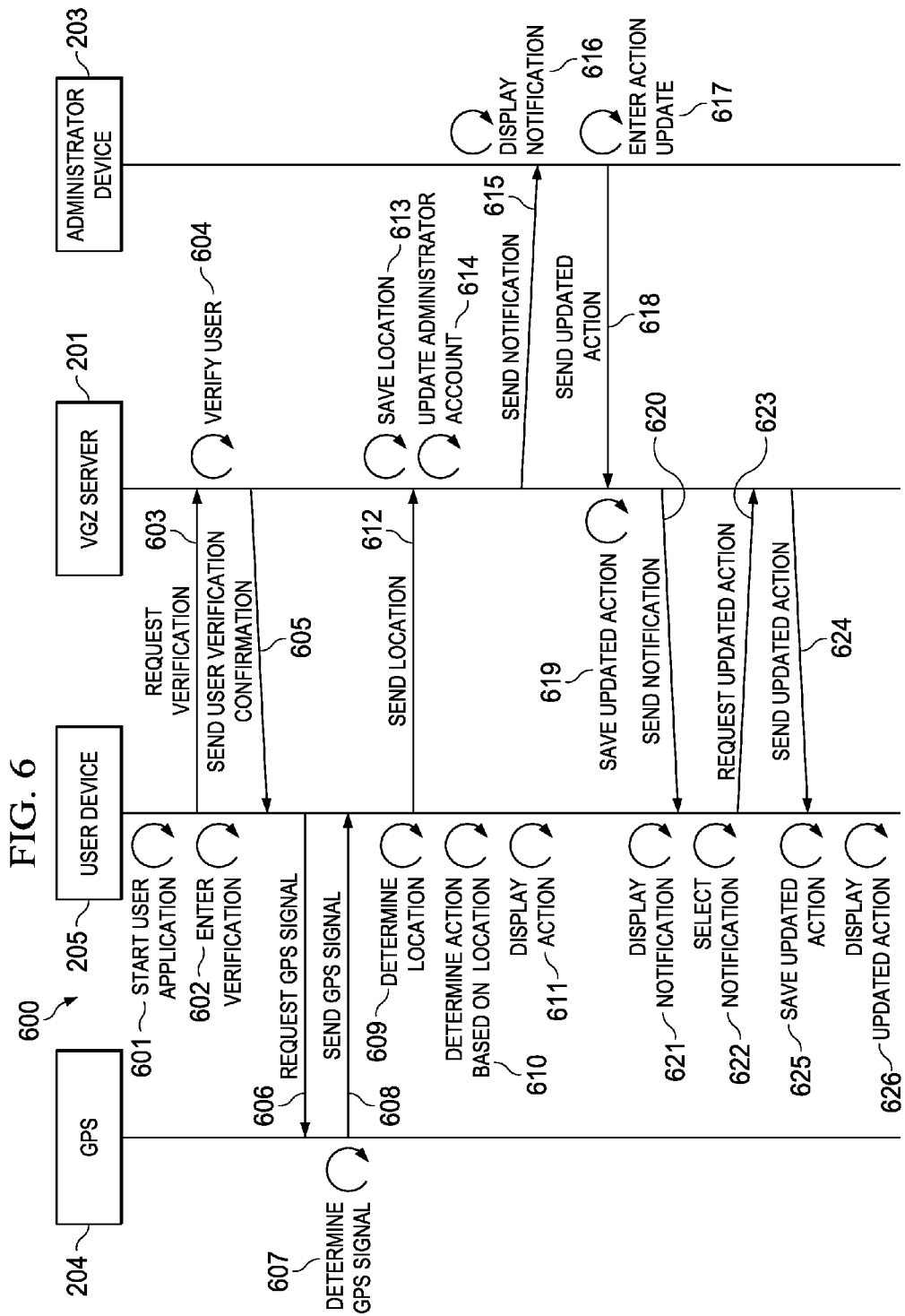
FIG. 6 is a flowchart of a user application method of a preferred embodiment.

Referring to FIG. 6, method 600 for user application 217 is described. In step 601, user application 217 is started on user device 205. In step 602, a user verification is entered. In step 603, the user verification is sent to VGZ server 201 to request verification. In step 604, the entered user verification is verified by comparing the entered user verification to a user verification stored in a user database. In step 605, a user verification notification is sent to user device 205 if the user is verified.

In step 606, a GPS signal from GPS 204 is requested. In step 607, GPS 204 determines the GPS signal that includes the position of the GPS satellite and the time at which the GPS signal is sent. In step 608, GPS 204 sends the GPS signal to user device 205. In step 609, a location of user device 105 is determined from the GPS signal. In step 610, a set of actions based on the location of user device 205 is determined. In a preferred embodiment, the location of user device 205 is compared to the zone and the sub-zone to determine if the location of user device 205 engages, i.e., is at or within, the boundary of the zone or the sub-zone. In this embodiment, the location of user device 205 is compared to the zone to determine if the zone is "nearby." If the location of user device 205 engages, then the set of actions of the zone or sub-zone is retrieved from memory. In another embodiment, method 521 is employed. In step 611, the set of actions are displayed on user device 205. In step 612, the location is sent to VGZ server 101.

In step 613, the location is saved as a user event. In step 614, the administrator account is updated with the user location. In step 615, a notification is sent to administrator device 203. In step 616, the notification is displayed on user device 203. In step 617, an updated action is entered on administrator device 203. In step 618, the updated action is sent to VGZ server 201. In step 619, the updated action is saved to the administrator account. In step 620, an updated action notification is sent to user device 205. In step 621, user device 605 displays the updated action notification. In step 622, the updated action notification is selected. In step 623, the updated action is requested from VGZ server 201.

In step 624, the updated action is sent to user device 205. In step 625, the updated action is saved to the memory of user device 205. In step 626, user device 205 displays the updated action.

Figure 7A:
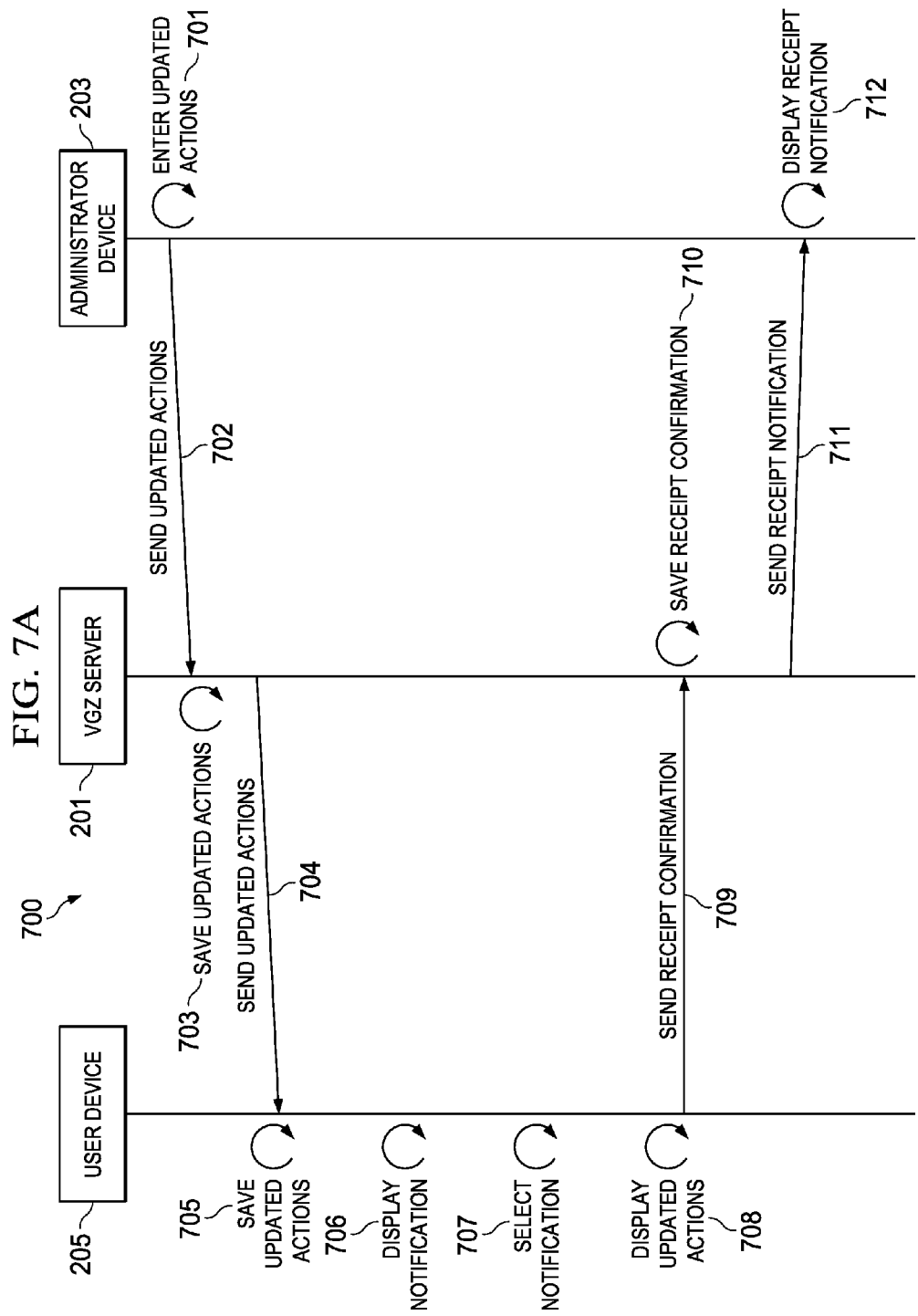
FIG. 7A is a flowchart of an action update method for an administrator application of a preferred embodiment.

Referring to FIG. 7A, method 700 for push updating actions is described. In this embodiment, the updated action is directly pushed to user device 205. In step 701, an updated action is entered into administrator device 203. In step 702, the updated action is sent to VGZ server 201. In step 703, the updated action is saved to the administrator account. In step 704, the updated action is sent to user device 205. In step 705, the updated action is saved to the memory of user device 205.

In step 706, user device 205 displays an updated action notification. In step 707, the updated action notification is selected. In step 708, the updated action is displayed on user device 205. In step 709, a receipt confirmation is sent to VGZ server 201. In step 710, the receipt confirmation is saved to the administrator account as a user event. In step 711, a receipt notification is sent to administrator device 203. In step 712, the receipt notification is displayed on administrator device 203.

Referring to FIG. 7B, method 713 for verifying and monitoring a user device location in a zone and a sub-zone is described. In step 714, administrator device 203 sends a request for a user device location to VGZ server 201. In step 715, VGZ server 201 sends the request for a user device location to user device 205. In step 716, user device 205 requests a GPS signal from GPS 204. In step 717, GPS 204 determines the GPS signal. In step 718, GPS 204 sends the GPS signal to user device 205. In step 719, user device 205 determines the location of user device 205. In step 720, user device 205 sends the location to VGZ server 201. In step 721, VGZ server 201 verifies the location by comparing the location to the zone and the sub-zone to determine if the location engages, i.e., is at or within the boundary of the zone or sub-zone. In one embodiment, method 521 is employed. In step 722, VGZ server 201 sends the location and a location verification to administrator device 203. In step 723, VGZ server 201 saves the location and the location verification to the administrator account. In step 724, administrator device 203 displays the location. In step 725, administrator device 203 displays the location verification.

In another embodiment, steps 716, 717, 718, 719, 720, 721, 722, 723, 724, and 725 are repeated to constantly monitor and verify the location of user device 205 from administrator device 203.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. In a system comprising a network, a server connected to the network, an administrator device connected to the network, and a user device connected to the network, the server programmed to store and execute instructions that cause the system to perform a method comprising the steps of:
   receiving, by the administrator device, a first set of points;
   defining, by the administrator device, a zone from the first set of points by defining the first set of points as a set of vertices for the zone;
   receiving, by the administrator device, a second set of points within the zone;
   defining, by the administrator device, a sub-zone from the second set of points;
   defining, by the administrator device, a set of actions for the zone;
   receiving, by the user device, a location of the user device;
   comparing, by the server, the location of the user device to a location of the zone; and,
   executing, by the user device, the set of actions if the location of the user device engages the zone.

2. The method of claim 1, further comprising the steps of:
   comparing, by the server, the location of the user device to a location of the sub-zone; and,
   executing, by the user device, the set of actions if the location of the user device is within the sub-zone.

3. The method of claim 1, wherein the step of defining a sub-zone by the administrator device further comprises the step of defining an "exclusion" zone by the administrator device.

4. The method of claim 1, further comprising the steps of:
receiving, by the administrator device, a subset of excluded actions from the set of actions;
associating, by the administrator device, the subset of excluded actions with the zone.

5. The method of claim 1, further comprising the step of updating, by the administrator device, the set of actions.

6. The method of claim 1, further comprising the step of:
periodically monitoring, by the user device, the location of the user device.

7. The method of claim 1, further comprising the steps of:
defining, by the administrator device, a set of zones from the first set of points;
determining, by the user device, a predicted path of the user device; and,
identifying, by the user device, a subset of zones from the set of zones along the predicted path.

8. The method of claim 1:
wherein each vertex of the set of vertices includes longitude, latitude, and altitude;
wherein the zone includes a building and a plurality of sub-zones;
wherein the zone includes a time period;
wherein the sub-zone is one of the plurality of sub-zones and each floor of the building includes one of the plurality of sub-zones;
wherein each sub-zone includes a time period; and,
wherein the zone is displayed on the user device.

9. In a system comprising a network, a server connected to the network, an administrator device connected to the network, and a user device connected to the network, the server programmed to store and execute instructions that cause the system to perform a method comprising the steps of:
receiving, by the administrator device, a first set of points;
defining, by the administrator device, a zone from the first set of points by defining the first set of points as a set of vertices for the zone;
receiving, by the administrator device, a second set of points within the zone;
defining, by the administrator device, a sub-zone from the second set of points;
defining, by the administrator device, a first set of actions for the zone;
defining, by the administrator device, a second set of actions for the sub-zone;
determining, by the user device, a location of the user device;
comparing, by the server, the location of the user device to a location of the zone;
executing, by the user device, the first set of actions if the location of the user device is within the zone;
comparing, by the server, the location of the user device to a location of the sub-zone; and,
executing, by the user device, the second set of actions if the location of the user device is within the sub-zone.

10. The method of claim 9, further comprising the steps of:
defining, by the administrator device, a subset of excluded actions from the first set of actions; and,
associating, by the administrator device, the subset of excluded actions with the sub-zone.

11. The method of claim 9, further comprising the step of updating, by the administrator device, the first set of actions.

12. The method of claim 9, wherein the step of defining a first set of actions for the zone by the administrator device further comprises the step of defining, by the administrator device, a set of advertisements.

13. The method of claim 9, wherein the step of receiving a first set of points by the administrator device further comprises receiving, by the administrator device, a set of GPS coordinates.

14. The method of claim 9, wherein the step of defining a first set of actions for the zone by the administrator device further comprises the step of defining, by the administrator device, a set of events.

15. The method of claim 9, further comprising the steps of:
periodically monitoring, by the user device, the location of the user device; and,
periodically determining, by the user device, if the location of the user device is within the zone.

16. The method of claim 9, further comprising the steps of:
calculating, by the user device, a predicted path of the user device; and,
determining, by the user device, if the zone includes the predicted path.

17. The method of claim 9, wherein the step of defining a zone by the administrator device further comprises the step of determining, by the administrator device, a zone type selected from the group of an "exclusion" zone and an "inclusion" zone.

18. The method of claim 9, wherein the step of defining a sub-zone by the administrator device further comprises the step of determining, by the administrator device, a sub-zone type selected from the group of an "exclusion" sub-zone and an "inclusion" sub-zone.

19. A system for interacting with a user, comprising:
a network;
a server, connected to the network,
an administrator device connected to the network,
a user device, connected to the network,
the administrator device programmed to carry out the steps of:
receiving a first set of points;
defining a set of zones from the first set of points by defining the first set of points as a set of vertices for the set of zones;
receiving a second set of points within the zone;
defining a sub-zone from the second set of points;
receiving a set of actions related to the set of zones;
the server programmed to carry out the steps of:
sending the set of zones to the user device;
sending the set of actions to the user device;
comparing the location of the user device to a location of the set of zones;
the user device programmed to carry out the steps of:
determining a location of the user device; and
executing the set of actions, if the location of the user device is engaged with the set of zones.

20. The system of claim 19,
wherein the administrator device is programmed to carry out the step of
defining the set of actions.

21. The system of claim 19, wherein the administrator device is further programmed to carry out the steps of:
receiving a subset of excluded actions from the set of actions; and,
associating the subset of excluded actions with a zone of the set of zones.

22. The system of claim 19, wherein the user device is further programmed to carry out the steps of:

monitoring the location of the user device at a predetermined frequency; and, altering the predetermined frequency, based on a velocity of the user device.

23. The system of claim 22, wherein the administrator device is further programmed to carry out the step of determining an "exclusion" zone.

24. The system of claim 22, wherein the set of actions is a set of coupons.

25. The system of claim 22, wherein the set of actions is a set of advertisements.

26. The system of claim 22, wherein the set of actions is a set of store events.

27. The system of claim 19, wherein the user device is further programmed to carry out the steps of:

determining a forward path for the user device;

identifying a subset of zones of the set of zones along the forward path; and, displaying the subset of zones.

28. A method of a user device connected to a network, the method comprising:

wherein an administrator device receives a first set of points;

wherein the administrator device defines a zone from the first set of points by defining the first set of points as a set of vertices for the zone;

wherein the administrator device receives a second set of points within the zone;

wherein the administrator device defines a sub-zone from the second set of points;

wherein the administrator device defines a set of actions for the zone;

receiving, by the user device, a location of the user device;

comparing, by the user device, the location of the user device to a location of the zone; and executing, by the user device, the set of actions delivered from the server associated with the zone, if the location of the user device is within the zone.

29. In a system comprising a network, a server connected to the network, an administrator device connected to the network, and a user device connected to the network, the user device programmed to store and execute instructions that cause the system to perform a method comprising the steps of:

receiving, by the server, a first set of points that were received by an administrator device;

receiving, by the server, a zone defined from the first set of points by the administrator device by defining the first set of points as a set of vertices for the zone;

receiving, by the server, a second set of points within the zone that were received by the administrator device, receiving, by the server, a sub-zone defined from the second set of points by the administrator device;

receiving, by the server, a set of actions defined for the zone by the administrator device;

receiving, by the server, a location of the user device that was received by the user device;

comparing, by the server, the location of the user device to a location of the zone; and, wherein the set of actions are executed by the user device if the location of the user device engages is within the zone.

* * * * *